United States Patent
Halin

[11] Patent Number: 5,832,717
[45] Date of Patent: Nov. 10, 1998

[54] FUEL INJECTION SUPPLY CIRCUIT FOR PROVIDING A METERED DECONTAMINATED FLOW OF FUEL TO THE FUEL INJECTORS

[75] Inventor: Yves Robert Halin, St. Germain Les Corbeil, France

[73] Assignee: Societe Nationale D'Etude et de Construction de Moteurs D'Aviation "Snecma", Paris, France

[21] Appl. No.: 819,370

[22] Filed: Mar. 17, 1997

[30] Foreign Application Priority Data

Mar. 21, 1996 [FR] France .................. 96 03498

[51] Int. Cl.$^6$ .................................................. F02C 9/28
[52] U.S. Cl. ........................................ 60/39.281; 210/106
[58] Field of Search .............................. 60/39.281, 39.27, 60/39.28 R, 223; 210/106; 123/510

[56] References Cited

U.S. PATENT DOCUMENTS

| | | | |
|---|---|---|---|
| 2,859,874 | 11/1958 | Stearns | 210/106 |
| 2,865,442 | 12/1958 | Halford | 210/106 |
| 3,675,772 | 7/1972 | Zhukovsky | 210/106 |
| 4,074,521 | 2/1978 | Smith | 60/39.281 |
| 4,118,926 | 10/1978 | Curvino | 60/39.281 |
| 4,738,597 | 4/1988 | D'Agostino | 60/39.281 |
| 5,209,058 | 5/1993 | Sparks | 60/39.281 |
| 5,513,493 | 5/1996 | Severn | 60/39.281 |

FOREIGN PATENT DOCUMENTS

| | | |
|---|---|---|
| 0 122 439 | 10/1984 | European Pat. Off. . |
| 0 307 264 | 3/1989 | European Pat. Off. . |
| 2 580 190 | 10/1986 | France . |

Primary Examiner—Carl S. Miller
Attorney, Agent, or Firm—Oblon, Spivak, McClelland, Maier & Neustadt, P.C.

[57] ABSTRACT

A fuel injection supply circuit including a main filter situated between a low pressure pump and a high pressure pump, and a fuel metering device for supplying a metered flow of fuel to the fuel injectors, is provided with a self-cleaning filter downstream of the high pressure pump such that a first portion of the fuel flow received by the self-cleaning filter is filtered to provide a clean flow of fuel to the fuel metering device and the excess portion of the received fuel flow passes through the center of the self-cleaning filter and is returned, via a control valve, to the circuit upstream of the main filter.

2 Claims, 2 Drawing Sheets

FUEL INJECTION SUPPLY CIRCUIT FOR PROVIDING A METERED DECONTAMINATED FLOW OF FUEL TO THE FUEL INJECTORS

BACKGROUND OF THE INVENTION

1. Field of the Invention

The invention relates to a fuel injection supply circuit for providing a metered decontaminated flow of fuel to the fuel injectors of the circuit, and is applicable in particular to the protection of the metering device and fuel injectors in the fuel supply circuit of a turbomachine, especially an aero-engine.

2. Summary of the Prior Art

In many devices using highly pressurized liquids, it is necessary that the liquid should be perfectly filtered to prevent wear caused by contaminants. It is current practice to meet this requirement using a filter cartridge which can be replaced when clogged, and it is also current practice to fit a by-pass valve which allows the liquid to flow when the cartridge becomes clogged. The condition of the filter must therefore be checked regularly in order to prevent rapid deterioration of the expensive equipment which the filter is intended to protect.

In the particular case of a fuel supply circuit of a turbomachine, the circuit generally includes a gear pump, for example of the proportioning type, a flow metering device and fuel injectors, and it is necessary to protect these components from external contamination originating from fuel tanks, and also to protect the metering device and the injectors from contamination caused by particles produced by wear or degradation of the pump. However, this double protection cannot be achieved using a single filter. Moreover, using two conventional filters placed respectively upstream and downstream of the pump involves installation difficulties, an increase in the weight of the engine, additional maintenance work, and operational difficulties due to the high pressure downstream of the pump. Furthermore, such an arrangement creates a pressure drop which is not insignificant and which increases as the clogging of the filter increases.

SUMMARY OF THE INVENTION

The aim of the invention is to provide a fuel injection supply circuit which can provide a metered decontaminated flow of fuel to the fuel injectors in an effective manner and without the need for additional monitoring and maintenance of the circuit.

For this purpose, according to the invention there is provided a fuel injection supply circuit for providing a metered decontaminated flow of fuel to the fuel injectors of said circuit, comprising a fuel flow path including a low pressure pump and a high pressure pump, a main filter located between said low pressure pump and said high pressure pump, a self-cleaning filter located downstream of said high pressure pump and including a filter cartridge disposed such that a first portion of the fuel flow received by said self-cleaning filter from said high pressure pump is filtered by said filter cartridge to provide a clean output fuel flow and a second portion of said received fuel flow washes substantially through the centre of said self-cleaning filter to provide an excess fuel flow, a fuel metering device for receiving said clean output fuel flow from said self-cleaning filter and supplying a metered flow of fuel to said fuel injectors, and means including a control valve for returning said excess fuel flow from said self-cleaning filter to said fuel flow path upstream of said main filter.

With such a fuel supply circuit, contaminants which are removed by the self-cleaning filter from the portion of fuel which forms the clean output flow for the fuel injectors are washed from the filter by that portion of the fuel which flows through the centre of the filter, and are thus recycled through the main filter and do not reach the fuel metering and injection circuit. Accordingly, contamination of the fuel, whatever its origin, is eventually collected by the main filter, and the self-cleaning filter does not require any special monitoring, nor any maintenance.

Preferably, a differential pressure detector is connected in parallel with said fuel metering device, and said control valve is controlled by said differential pressure detector.

Other features and advantages of the invention will become apparent from the following description of the preferred embodiment, given by way of example, with refeence to the attached drawings.

DESCRIPTION OF THE PREFERRED EMBODIMENT

Figure 1:
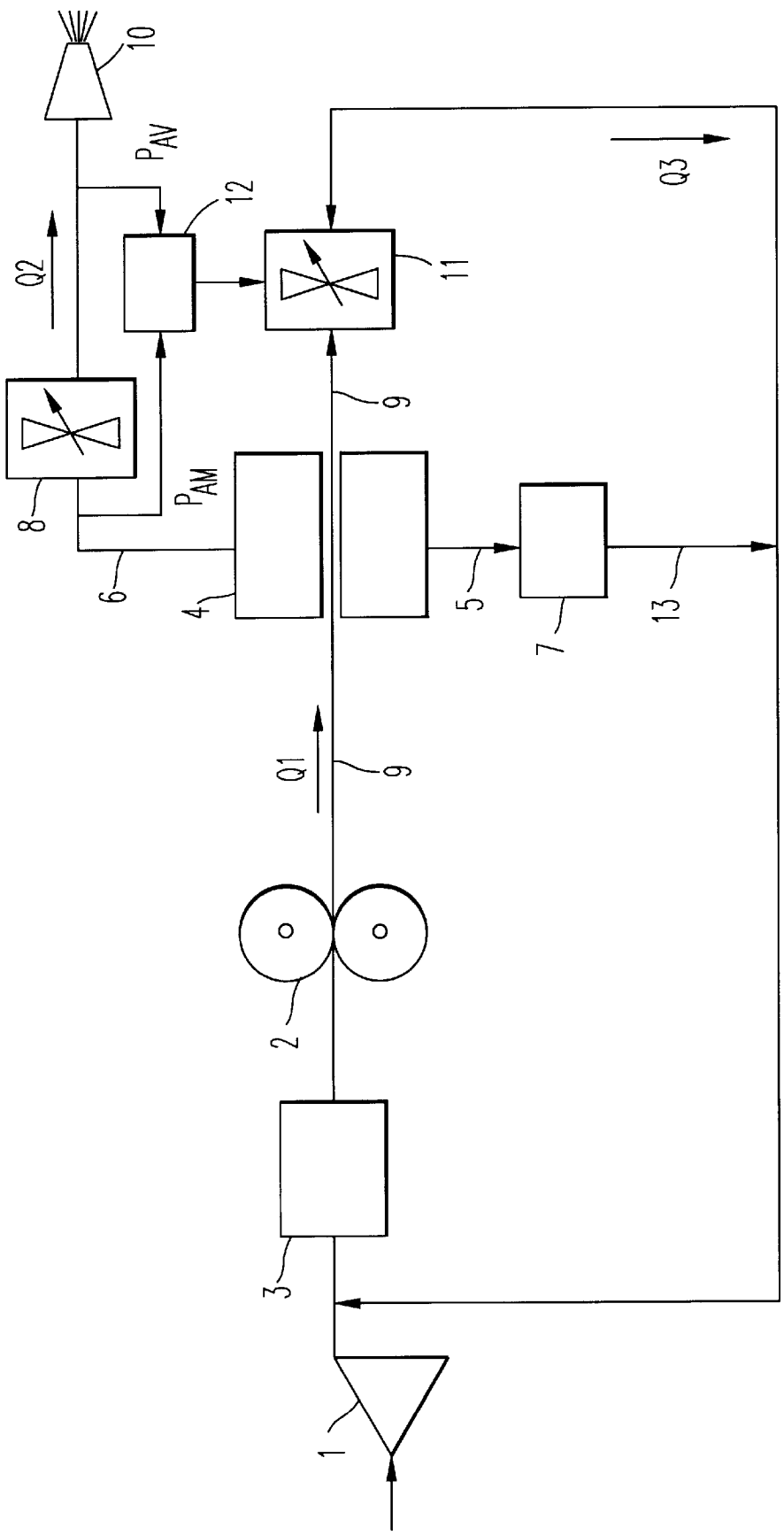
FIG. 1 shows a block diagram of one embodiment of a fuel injection supply circuit in accordance with the invention.

The fuel supply circuit depicted in FIG. 1 comprises a low pressure pump 1 which receives fuel from a booster pump (not shown) situated in a fuel tank, and which delivers the fuel to a high pressure pump 2 through a main filter 3 disposed between the two pumps. Downstream of the high pressure pump, the flow of fuel Q1 passes through a self-cleaning filter 4 from which portions 5,6 of the fuel flow are taken to supply, on the one hand, servo-mechanisms 7 belonging to the engine regulation system, and on the other hand, a fuel metering device 8 for providing a metered flow of fuel Q2 to fuel injectors 10. The return flow of fuel 13 from the output of the servomechanisms 7 is conducted back to the upstream side of the main filter 3.

The self-cleaning filter 4 comprises a filter cartridge arranged parallel to the path 9 of the incoming flow of fuel from the high pressure pump, and the fuel portions 5,6 taken from the self-cleaning filter 4 are taken perpendicularly to the path 9 and hence pass transversely through the filter cartridge. This enables the operator to make use of the dynamic effect of separating the particles in the self-cleaning filter 4 to supply the servomechanisms 7 and the metering device 8 with clean fuel. The excess fuel which is not taken in this way flows through the centre of the self-cleaning filter 4 in the direction of the path 9 and is returned upstream of the main filter 3 via a control valve 11 disposed between the exit of the self-cleaning filter 4 and the inlet of the main filter 3. The aperture of the control valve 11 is controlled by a differential pressure detector 12 connected in parallel with the metering device 8.

The output from the differential pressure detector 12 is processed so as to keep constant the pressure difference PAV-PAM across the terminals of the metering device 8. The aperture of the control valve 11 determines the value of the metered flow Q2 and the value of the excess flow Q3 returned upstream of the main filter 3.

In the self-cleaning filter 4, the excess fuel flow Q3 passing through the centre of the filter 4 removes the contaminating particles trapped inside the filter cartridge of the filter, and carries them downstream towards the control valve 11. This filter 4, therefore, does not need any maintenance or special monitoring. From the control valve 11, this flow of fuel Q3, which might be polluted by particles originating from wear of the high pressure pump 2, returns upstream of the main filter 3, and the polluting particles therefore never reach the metering device 8 or the fuel injectors 10. The particular arrangement of the self-cleaning filter 4 in the fuel supply circuit thus avoids degradation of equipment as a result of any internal contamination by metallic particles originating, for example, from deterioration of the high pressure pump 2. In order that the self-cleaning of the filter 4 is carried out efficiently, it is necessary that the flow of excess fuel Q3 which passes through the centre of the filter 4 should always be at least equal to the flow of metered fuel Q2.

Figure 2:
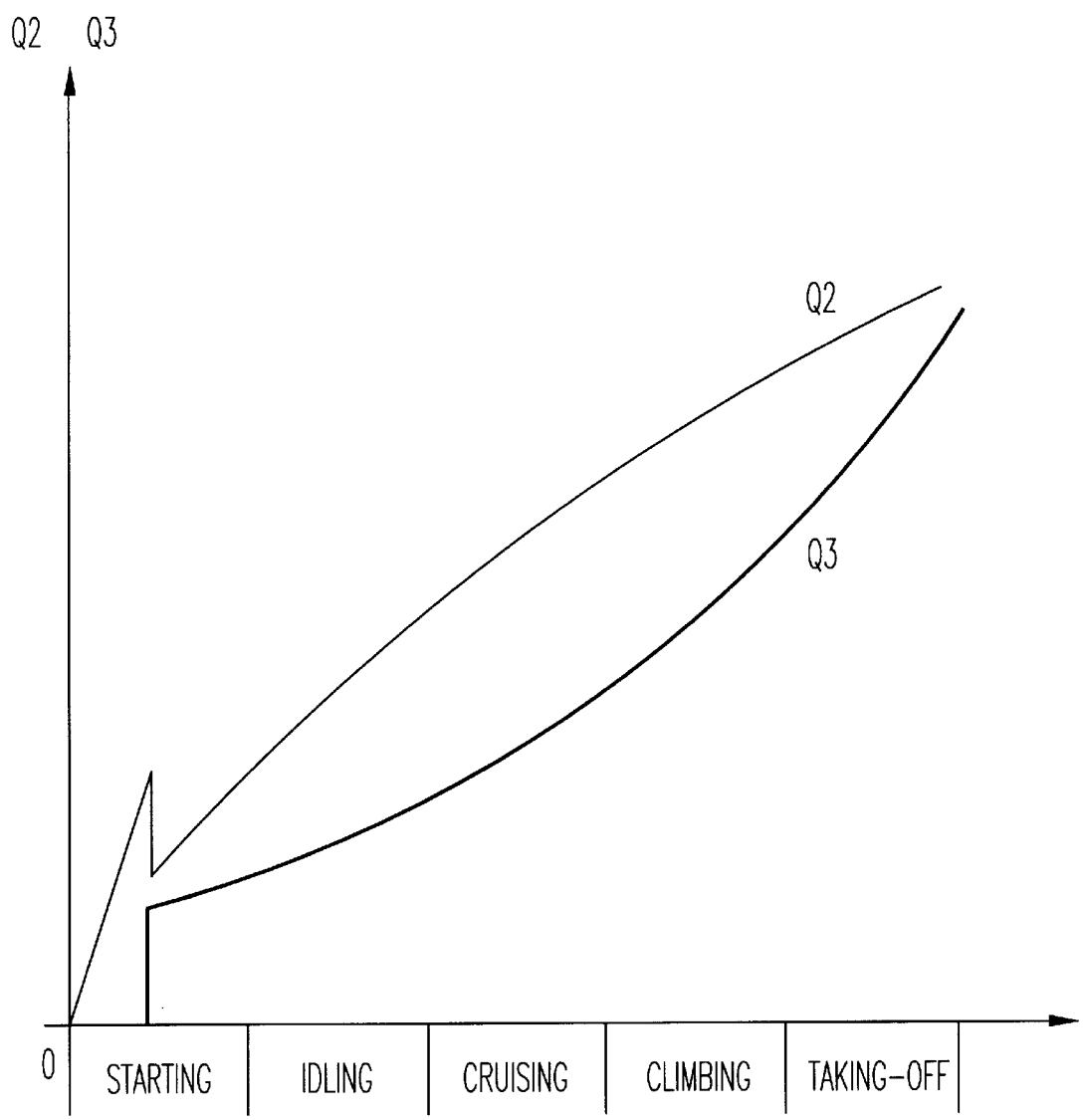
FIG. 2 is a diagram showing graphically the changes in the flow of fuel to the injectors, and in the recirculated fuel flow, as a function of the operational regime of a turbojet engine utilizing the fuel supply circuit.
Figure 2:
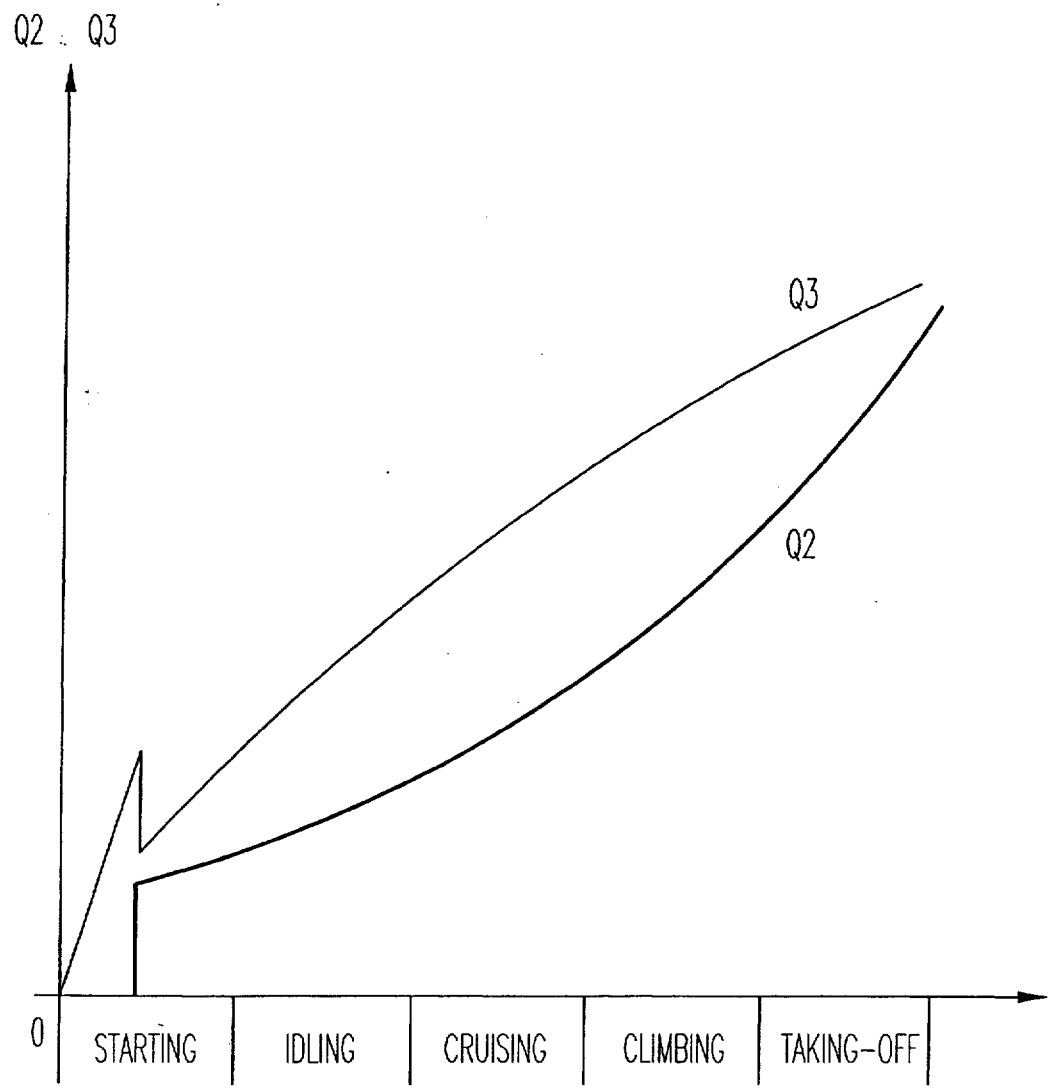

This condition is always met in a turboject engine, as is shown by FIG. 2 which illustrates the changes in the fuel flows Q2 and Q3 as a function of the operating regime of the engine during a typical engine cycle.

In a turbojet engine, the rating of the high pressure pump 2 is set for operational regimes corresponding to the restarting of the engine during flight, i.e. when the rotational speed of the pump is low. The pump is therefore oversized for all other operational regimes of the engine. As the rotational speed of the pump is much higher for all other operational regimes of the engine, the flow of fuel is more substantial, and the requirement that the excess flow of fuel Q3 passing through the centre of the self-cleaning filter 4 should be greater than the flow of metered fuel Q2 is always met.

I claim:

1. A fuel injection supply circuit for providing a metered decontaminated flow of fuel to the fuel injectors of said circuit, comprising a fuel flow path including a low pressure pump and a high pressure pump, a main filter located between said low pressure pump and said high pressure pump, a self-cleaning filter located downstream of said high pressure pump and including a filter cartridge disposed such that a first portion of the fuel flow received by said self-cleaning filter from said high pressure pump is filtered by said filter cartridge to provide a clean output fuel flow and a second portion of said received fuel flow washes substantially through the center of said self-cleaning filter to provide an excess fuel flow, a fuel metering device for receiving said clean output fuel flow from said self-cleaning filter and supplying a metered flow of fuel to said fuel injectors, and means including a control valve for returning all of said excess fuel flow from said self-cleaning filter to said fuel flow path upstream of said main filter.

2. A fuel supply circuit according to claim 1, wherein a differential pressure detector is connected in parallel with said fuel metering device, and said control valve is controlled by said differential pressure detector.

* * * * *

UNITED STATES PATENT AND TRADEMARK OFFICE
CERTIFICATE OF CORRECTION

PATENT : 5,832,717

DATED : November 10, 1998

Page 1 of 2

INVENTOR(S) : Yves R. Halin

It is certified that error appears in the above-identified patent and that said Letters Patent is hereby corrected as shown below:

In the drawings, Sheet 2 of 2, consisting of Fig. 2, should be deleted to be replaced with the corrected Fig. 2, as shown on the attached page.

Signed and Sealed this

Eighteenth Day of July, 2000

*Attest:*

Q. TODD DICKINSON

*Attesting Officer*      *Director of Patents and Trademarks*